Sept. 4, 1945.  J. C. WILSON  2,384,225
METHOD AND APPARATUS FOR MAINTAINING UNIFORM TEMPERATURE
OF DIVERSE FLUIDS IN A MACHINE TOOL
Filed Nov. 22, 1944

INVENTOR
JOHN C. WILSON,
BY
Toulmin & Toulmin
ATTORNEYS

Patented Sept. 4, 1945

2,384,225

UNITED STATES PATENT OFFICE 2,384,225

METHOD AND APPARATUS FOR MAINTAINING UNIFORM TEMPERATURE OF DIVERSE FLUIDS IN MACHINE TOOLS

John C. Wilson, Springfield, Ohio, assignor to The Thompson Grinder Company, Springfield, Ohio, a corporation of Ohio Application November 22, 1944, Serial No. 564,674

9 Claims. (Cl. 51—267)

This invention relates to a method and apparatus for maintaining uniform temperature of diverse fluids in a machine tool.

It is an object of this invention to provide, particularly in a machine tool or grinding machine, a method and apparatus by which the cutting and cooling fluid has its temperature elevated to prevent its temperature from being lowered by reason of evaporation to a point that is too cool for satisfactory operation in connection with the grinding and cutting operations of the machine tool and by which the hydraulic actuating fluid utilized in the operating system of the grinding machine or machine tool has its temperature reduced and maintained at the correct temperature for satisfactory operation. Heretofore it has been a problem in grinding machines and the like which are hydraulically actuated and which are supplied with coolant fluid for application to the work to regulate the temperature of both fluids; one would run too hot and the other would run too cold. A further problem arose in connection with such temperature controls and that was in connection with the fact that, while the hydraulic fluid might be in substantially constant operation, the coolant fluid would only be intermittently used. The best results from both the coolant and the actuating hydraulic fluid or oil could only be accomplished with a regulated temperature under all conditions of standby or operating phases of the grinding machine or other machine tool.

It is, therefore, an object of this invention to provide a method and apparatus by which the hydraulic fluid for actuating the grinding machine and the like is continuously circulated, whether actuating the mechanism or not and the coolant fluid is continuously circulated, whether it is being delivered to the work piece and working mechanism or not. In this way, the two fluids are substantially all of the time while the machine is in operation moving through their circuits.

It is a further object to provide concentric channels of flow of these fluids adjacent to one another and flowing in opposite directions. In this manner the excessive heat in the actuating oil is used to elevate the temperature of the coolant and the continuous operation of the movement of both fluids is maintained to avoid the difficulties heretofore encountered of a wide variation in temperature of the coolant or cutting compound fluid due to the fact that it is intermittently operated.

In the case of the actuating oil, it upon occasion can be arranged to circulate intermittently due to the fact that the continuous circulation of the cooler or coolant fluid is sufficient to carry away any excess heat during the period of no circulation of the oil but it is preferable to have both circulating and in any event it is essential that the coolant circulate continuously.

Referring to the drawing

Figure 1:
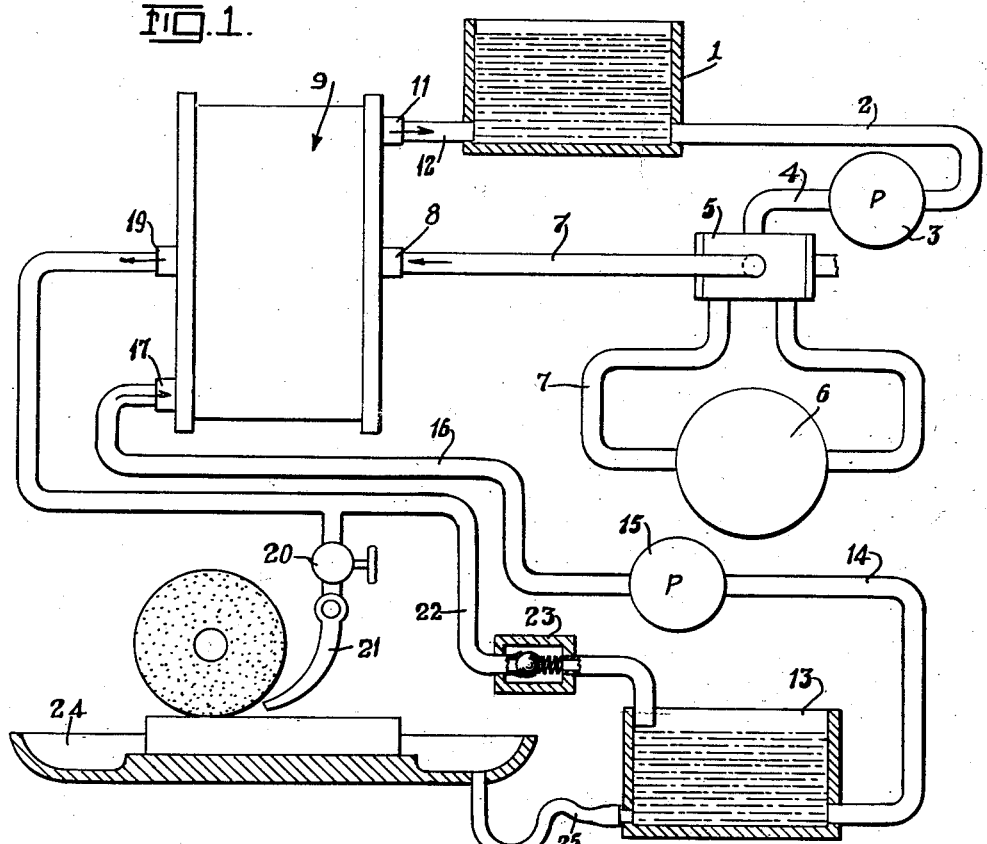
Figure 1 is a diagrammatic view showing the complete fluid systems and their operation.
Figure 2:
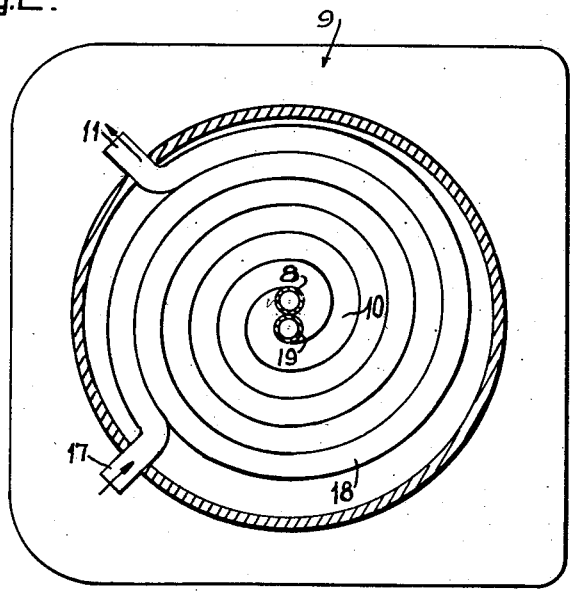
Figure 2 is a section on the line 2—2 of Figure 1 looking in the direction of the arrows showing the arrangement of the intercooler passageways to effect the heat transfer.

Referring to the drawing in detail, the following is a description of the apparatus and the method of its operation.

*Hydraulic oil actuating circuit*

The oil sump 1 supplies the actuating oil for the hydraulic actuating system of the grinding machine or machine tool through the pipe line 2 under the impetus of the pump 3 which delivers through the pipe 4 the fluid under pressure to a control valve 5 and thence into the actuating system 6 shown diagrammatically. It will be understood that this system may be quite complex but it is shown in a simple diagram in this accompanying drawing for the purpose of illustration.

The hot oil then passes through the pipe 7 to the inlet 8 of the heat interchanger generally designated 9. The oil circulates through the passageways 10 until it makes its exit at 11 whence it is returned by the pipe 12 to the sump 1 as cool oil.

*Coolant fluid system*

The system for circulating the coolant liquid consists of a sump or reservoir 13 from which oil is drawn through the pipe 14 by the pump 15 and delivered through the pipe 16 into the heat interchanger 9 as at 17 whence it circulates in a counterflow direction to the hydraulic actuating fluid through the passageways 18 and thence out the exit 19 through the control valve 20 and through the spray nozzle 21 to a grinding wheel or other grinding or cutting implement. If the nozzle is closed or the valve 20 is closed during the period of inoperation of the use of the coolant liquid being applied to the work piece and the grinding or cutting implement, the cooling fluid continues to flow through a by-pass line 22 due to the fact that the pressure of the pump 15 causes a lifting of the check valve 23 so that the fluid can pass through the pipe 22 back into the sump 13. In this way we have continuous circulation of the coolant fluid. As soon as the valve 20 and nozzle 21 are opened up the fluid will pass out through the nozzle 21 and the check valve 23 will close. The discharged coolant is then collected in the usual manner as at 24 and returned by a pipe 25 to the sump 13.

Method

Consequently by intermittent or continuous circulation of the hot oil and the continuous circulation of the cool fluid it is possible to keep the cool fluid at the proper temperature and keep the hydraulic actuating system at a correct temperature so as to prevent the breakdown of the oil, foaming, gravitation and the like in the pumping system.

Heretofore, various attempts by way of refrigeration, air coolers and water coolers and various other means have been tried without marked success in connection with machine tool hydraulically actuated systems. The high evaporation rate of the coolant fluid, particularly when it is continuously moved and is brought into lengthy heat transfer relationship with the hot oil provides a ready means without any extra pumps or other equipment for maintaining the correct temperatures in both fluids. One of the features of this invention is the moving concentrically in opposite directions in separate paths in heat transfer relationship of the two fluids thereby making it possible within a small compass necessary in a machine tool to effect the heat interchange over a long enough circuit to secure the desired result and this result is further perfected and amplified by having continuous cooling action of the continuous movement of the cooling fluid even though the hydraulic actuating fluid is not always flowing. Due to the valuable floor space in the shops employing these machine tools and the necessity for economy in that direction, it has been difficult to find any cooling mechanism that was not too cumbersome and bulky and too expensive to operate. The operating mechanism of this invention does not require any extra added expense.

It will be understood that it is desired to comprehend within this invention such modifications as come within the scope of the claims and the invention.

Having thus fully described my invention what I claim as new and desire to secure by Letters Patent is:

1. In a method of controlling the temperature in a machine tool of hydraulic actuating fluid and coolant fluid the step (a) of continuously circulating the coolant fluid in counterflow heat transfer relationship to the hydraulic actuating fluid; and the step (b) of circulating the hydraulic actuating fluid through the working mechanism of the tool.

2. In a method of controlling the temperature in a machine tool of hydraulic actuating fluid and coolant fluid the step (a) of continuously circulating the coolant fluid in counterflow heat transfer relationship to the hydraulic actuating fluid; and the step (b) of circulating the hydraulic actuating fluid through the working mechanism of the tool prior to bringing the two fluids in heat transfer, counterflow relationship.

3. In a method of controlling the temperature in a machine tool of hydraulic actuating fluid and coolant fluid the step (a) of circulating coolant fluid; the step (b) of effecting cooling action upon the coolant fluid by evaporation of a portion thereof; and the step (c) of bringing operating hydraulic fluid of higher temperature into heat transfer relationship to the coolant fluid.

4. In a method of controlling the temperature in a machine tool of hydraulic actuating fluid and coolant fluid the step (a) of circulating coolant fluid; the step (b) of effecting cooling action upon the coolant fluid by evaporation of a portion thereof; and the step (c) of bringing operating hydraulic fluid of higher temperature into heat transfer relationship to the coolant fluid in counterflow relationship.

5. In a method of controlling the temperature in a machine tool of hydraulic actuating fluid and coolant fluid the step (a) of circulating continuously coolant fluid and intermittently causing a cooling fluid to partially evaporate to reduce its temperature; and the step (b) of circulating hydraulic actuating fluid of higher temperature in heat transfer counterflow relationship to the continuously circulating cooling fluid.

6. In a method of controlling the temperature in a machine tool of hydraulic actuating fluid and coolant fluid the step (a) of circulating continuously coolant fluid and intermittently causing a cooling fluid to partially evaporate to reduce its temperature; and the step (b) of circulating hydraulic actuation fluid of higher temperature in heat transfer counterflow relationship to the continuously circulating cooling fluid, said higher temperature actuating fluid being circulated intermittently.

7. In combination a hydraulic actuating fluid circulating mechanism comprising a pump, sump, actuating mechanism for a machine tool having a counterflow heat interchanger in circuit with said pump and sump; a coolant circulating mechanism comprising a sump, pump, spray nozzle and by-pass conveying means to the sump interconnected with said counterflow heat transfer mechanism.

8. In combination a hydraulic actuating fluid circulating mechanism comprising a pump, sump, actuating mechanism for a machine tool having a counterflow heat interchanger in circuit with said pump and sump; a coolant circulating mechanism comprising a sump, pump, spray nozzle and by-pass conveying means to the sump interconnected with said counterflow heat transfer mechanism, said cooling mechanism being so arranged that the coolant fluid may be either returned to the sump through a spray nozzle and thence to the sump or by-pass the spray nozzle and go direct to the sump and valve means associated with the by-pass mechanism and the spray nozzle for regulating the movement of said cooling fluid.

9. In combination in a mechanism for utilizing the coolant fluid in a machine tool for reducing the temperature in the hydraulic actuating fluid for the machine tool, a heat interchanger comprising concentric passageways for the respective fluids through which the fluids move in counterflow relationship, a pumping system for the coolant fluid comprising a pump, sump, spray nozzle, by-pass line and return line from the spray to the sump connected to said heat interchange mechanism and the hydraulic actuating circuit mechanism comprising a pump, sump, actuating mechanism and lines interconnecting the heat interchanger to the outlet side of the actuating mechanism and to said sump on the respective inlet and outlet sides of the heat interchanger.

JOHN C. WILSON.